United States Patent
Zhu et al.

(10) Patent No.: US 12,259,190 B2
(45) Date of Patent: Mar. 25, 2025

(54) HEAT PIPE AND GEOTHERMAL ENERGY COLLECTING DEVICE

(71) Applicant: SHENZHEN FLUENTROP TECHNOLOGY CO., LTD., Guangdong (CN)

(72) Inventors: Yonggang Zhu, Guangdong (CN); Yongyao Li, Guangdong (CN); Huizhu Yang, Guangdong (CN); Chuanwen Lv, Guangdong (CN)

(73) Assignee: SHENZHEN FLUENTROP TECHNOLOGY CO., LTD., Guangdong (CN)

( * ) Notice: Subject to any disclaimer, the term of this patent is extended or adjusted under 35 U.S.C. 154(b) by 95 days.

(21) Appl. No.: 17/801,116

(22) PCT Filed: Jul. 23, 2021

(86) PCT No.: PCT/CN2021/108088
§ 371 (c)(1),
(2) Date: Aug. 19, 2022

(87) PCT Pub. No.: WO2022/037358
PCT Pub. Date: Feb. 24, 2022

(65) Prior Publication Data
US 2023/0168045 A1    Jun. 1, 2023

(30) Foreign Application Priority Data
Aug. 18, 2020   (CN) .......................... 202010833209.1

(51) Int. Cl.
*F28D 15/02*    (2006.01)
*F24T 10/17*    (2018.01)
*F24T 10/40*    (2018.01)

(52) U.S. Cl.
CPC .......... *F28D 15/0275* (2013.01); *F24T 10/17* (2018.05); *F24T 10/40* (2018.05); *F28D 15/0266* (2013.01)

(58) Field of Classification Search
CPC .. F28D 15/0275; F28D 15/0266; F28D 15/04; F24T 10/17; F24T 10/40; Y02E 10/10
(Continued)

(56) References Cited

U.S. PATENT DOCUMENTS

| | | | | |
|---|---|---|---|---|
| 3,911,683 A | * | 10/1975 | Wolf | F03G 7/04 |
| | | | | 165/45 |
| 4,286,651 A | * | 9/1981 | Steiger | E02D 5/72 |
| | | | | 175/22 |

(Continued)

FOREIGN PATENT DOCUMENTS

| | | |
|---|---|---|
| CN | 2143761 Y | 10/1993 |
| CN | 101566441 A * | 10/2009 |

(Continued)

OTHER PUBLICATIONS

Machine Translation CN 101566441A (Year: 2009).*
(Continued)

*Primary Examiner* — Len Tran
*Assistant Examiner* — Gustavo A Hincapie Serna
(74) *Attorney, Agent, or Firm* — RANKIN, HILL & CLARK LLP

(57) ABSTRACT

A heat pipe and a geothermal energy collecting device. The heat pipe includes a sealing member which is provided with channels; a first pipe body, one end of the first pipe body has an opening, and an other end of the first pipe body is sealed by the sealing member, which has a first chamber, first heat transfer members which are connected to the sealing member and located at one side of the sealing member, each of the first heat transfer members has a first cavity; and second
(Continued)

heat transfer members which are connected to the sealing member and located at an other side of the sealing member, each of second heat transfer members has a second cavity configured to communicate with the first cavity of a corresponding one of the first heat transfer members via a respective one of the channels.

12 Claims, 9 Drawing Sheets

(58) Field of Classification Search
USPC .................................................. 165/104.26
See application file for complete search history.

(56) References Cited

U.S. PATENT DOCUMENTS

| | | | | |
|---|---|---|---|---|
| 4,510,759 | A * | 4/1985 | Sakai | F28D 15/0233 |
| | | | | 165/104.11 |
| 4,512,156 | A * | 4/1985 | Nagase | F24T 10/17 |
| | | | | 165/45 |
| 5,467,429 | A * | 11/1995 | Uchimura | G06F 18/2453 |
| | | | | 706/26 |
| 5,647,429 | A | 7/1997 | Oktay et al. | |
| 5,862,866 | A * | 1/1999 | Springer | F16L 59/06 |
| | | | | 166/57 |
| 7,841,200 | B1 * | 11/2010 | Wiggs | F24T 10/13 |
| | | | | 165/45 |
| 8,875,778 | B2 * | 11/2014 | Marois | F24T 10/15 |
| | | | | 165/45 |
| 9,920,499 | B2 * | 3/2018 | Lisin | E02D 31/14 |
| 10,203,162 | B2 * | 2/2019 | Yokomine | F28D 7/106 |
| 12,025,350 | B2 * | 7/2024 | Cho | F24T 50/00 |
| 2003/0037774 | A1 * | 2/2003 | Schweinzer | F28D 15/0275 |
| | | | | 165/104.28 |
| 2009/0107650 | A1 * | 4/2009 | Feldmann | F24T 10/40 |
| | | | | 165/45 |
| 2012/0227935 | A1 * | 9/2012 | Huang | B21D 41/04 |
| | | | | 29/890.032 |
| 2013/0075064 | A1 * | 3/2013 | Fetcu | F28F 9/22 |
| | | | | 165/104.21 |
| 2014/0047853 | A1 * | 2/2014 | Zhong | B60H 1/32014 |
| | | | | 62/106 |
| 2015/0013981 | A1 * | 1/2015 | Shimko | E21B 7/061 |
| | | | | 166/298 |
| 2015/0292774 | A1 * | 10/2015 | Kang | F24T 10/30 |
| | | | | 165/45 |
| 2015/0300327 | A1 * | 10/2015 | Sweatman | F24T 10/20 |
| | | | | 60/641.2 |
| 2016/0131435 | A1 * | 5/2016 | Lee | F28D 15/0233 |
| | | | | 165/104.21 |
| 2016/0209083 | A1 * | 7/2016 | Yu | F24T 10/10 |
| 2017/0248345 | A1 * | 8/2017 | Parrella | F24T 10/30 |
| 2017/0336151 | A1 * | 11/2017 | Shimada | F28D 15/046 |
| 2020/0025419 | A1 * | 1/2020 | Sakai | F24T 10/20 |
| 2021/0254862 | A1 * | 8/2021 | Jiang | F28D 15/04 |
| 2021/0396430 | A1 * | 12/2021 | Cook | E21B 43/267 |

FOREIGN PATENT DOCUMENTS

| | | | | |
|---|---|---|---|---|
| CN | 101865571 | A * | 10/2010 | |
| CN | 106839842 | A * | 6/2017 | ......... F28D 15/0275 |
| CN | 206787355 | U * | 12/2017 | |
| CN | 109029033 | A * | 12/2018 | ......... F28D 15/0275 |
| CN | 109724278 | A | 5/2019 | |
| CN | 110017528 | A | 7/2019 | |
| CN | 111964499 | A | 11/2020 | |
| CN | 110906428 | B * | 2/2021 | |
| DE | 202010005850 | U1 * | 1/2011 | ............ F28D 15/02 |
| JP | S5297461 | A | 8/1977 | |

OTHER PUBLICATIONS

CN 101566441A Machine Translation (Year: 2009).*
CN 109029033A Machine Translation (Year: 2018).*
International Search Report, International Application No. PCT/CN2021/108088 dated Oct. 21, 2021, 3 pages.

* cited by examiner

HEAT PIPE AND GEOTHERMAL ENERGY COLLECTING DEVICE

CROSS REFERENCE TO RELATED APPLICATION

This patent application is a national application of International patent application No PCT/CN2021/108088, filed on Jul. 23, 2021, which claims the priority of Chinese Patent Application No. 202010833209.1 entitled "HEAT PIPE AND COLLECTING DEVICE" filed with the Chinese Patent Office on Aug. 18, 2020, which is incorporated by reference herein in its entirety as part of the present application.

TECHNICAL FIELD

The present disclosure relates to the field of geothermal energy collecting, and in particular relates to a heat pipe and a geothermal energy collecting device.

BACKGROUND ART

As a green, low-carbon, and recyclable clean energy, geothermal resources are increasingly prominent in controlling pollution and reducing haze, changing the structure of energy consumption and improving ecological civilization. Heat pipes as heat transfer elements can rapidly transfer the heat from a heat source to a remote end by using phase change heat transfer of a working medium in each pipe. In related technologies, a heat pipe unit is generally formed by assembling multiple heat pipes, and every adjacent two heat pipes are connected by using sealing plugs. However, the heat transfer resistance at the connection of the heat pipes is higher in this mode, the heat is hard to be transferred effectively, and the problem of heat transfer failure is prone to occurring when the length of the heat pipe is longer.

SUMMARY

The present disclosure aims to at least solve one of the technical problems in the prior art. To this end, the present disclosure provides a heat pipe which can reduce the heat transfer resistance at the connection of heat pipes so as to improve heat transfer efficiency.

The present disclosure further provides a geothermal energy collecting device using the heat pipes.

In a first aspect, a heat pipe is provided by the present disclosure, including: a sealing member provided with channels; a first pipe body, one end of the first pipe body has an opening and an other end of the first pipe body is sealed by the sealing member, the first pipe body has a first chamber for accommodating a heat transfer working medium; first heat transfer members which are connected to the sealing member and located at one side of the sealing member, each of the first heat transfer members has a first cavity; and second heat transfer members which are connected to the sealing member and located at an other side of the sealing member, each of the second heat transfer members has a second cavity configured to communicate with the first cavity of a corresponding one of the first heat transfer members via a respective one of the channels, such that a second chamber for accommodating a second heat-transfer working medium is defined jointly by the second heat transfer member and the corresponding one of the first heat transfer members, and the second chamber and the first chamber are spaced apart.

The heat pipe provided by the embodiments at least has the following beneficial effects.

In the present disclosure, the heat pipe is provided with the first heat transfer members and the second heat transfer members. In a heat pipe unit formed by connecting multiple heat pipes, heat transfer can be performed between every adjacent two heat pipes via interstage heat pipes formed by the first heat transfer members and the second heat transfer members thereof. The interstage heat pipes have a lower heat resistance, and is enabled to extend into the first chamber to be fully in contact with steam, thereby facilitating to improve heat exchange efficiency.

The heat pipe according to some other embodiments of the present disclosure, a head end of the first pipe body may be sealed by the sealing member, the first heat transfer members may be located at an upper side of the sealing member, and the second heat transfer members may be located at a lower side of the sealing member along a heat transfer direction; the heat pipe further includes flow guiding members, each of the second heat transfer members may be connected with ones of the flow quiding members, one end of each of the ones of the flow guiding members may be connected to the second heat transfer member, and an other end of the flow guiding member extends downwards and may be connected to an inner wall of the first pipe body.

The heat pipe according to some other embodiments of the present disclosure, the heat pipe further includes a second pipe body, the second pipe body may be located at an inner side of the first pipe body, and a gap may be formed between the second pipe body and the first pipe body.

The heat pipe according to some other embodiments of the present disclosure, a surface of each of the first heat transfer members and a surface of a corresponding one of the second heat transfer members may be provided with wicks.

The heat pipe according to some other embodiments of the present disclosure, an inner surface of the first pipe body is provided with wicks.

In a second aspect, a heat pipe is provided by the present disclosure, including sealing members; a first pipe body, one end of the first pipe body is sealed by one of the sealing members and an other end of the first pipe body is sealed by an other sealing member of the sealing members, the first pipe body has a first chamber for accommodating a first heat-transfer working medium; first heat transfer members which are connected to the one of the sealing members and located in the first chamber, each of the first heat transfer members has a first cavity; and second heat transfer members which are connected to the other sealing member and located in the first chamber, the second heat transfer member has a second cavity.

In a third aspect, a collecting device is provided by the present disclosure, including: a collecting part including multiple heat pipes, one end of one of every adjacent two of the ones of the plurality of heat pipes which has the opening is connected to one end, which has the sealing member, of an other one of the every adjacent two of the ones of the multiple heat pipes; and a heat exchange part including a heat exchanger, the heat exchanger is configured for transferring heat collected by the geothermal energy collecting part.

The collecting device according to some other embodiments of the present disclosure, the device further includes a heat transfer part, a tail end of the heat transfer part may be connected to a head end of the geothermal energy collecting part, and a head end of the heat transfer part may be connected to the heat exchange part along the heat transfer direction.

The collecting device according to some other embodiments of the present disclosure, the heat transfer part includes multiple heat pipes, one end, which has the opening, of one of every adjacent two of the other ones of the multiple heat pipes may be connected to one end, which has the sealing member, of an other one of the every adjacent two of the other ones of the multiple heat pipe.

The collecting device according to some other embodiments of the present disclosure, two ends of each of the heat pipes may be provided with respective flanges, and every adjacent two of the heat pipes may be attached via adjacent two of the respective flanges and may be connected by threaded fasteners; or the device further includes connecting sleeves, and adjacent ends of the every adjacent two of the heat pipes may be inserted into a corresponding one of the connecting sleeves.

In a fourth aspect, a collecting device is provided by the present disclosure, including: a geothermal energy collecting part including multiple heat pipes, one end, which is provided with the first heat transfer members, of one of every adjacent two heat pipes of the multiple heat pipes is connected to one end, which is provided with the second heat transfer members, of an other one of the every adjacent two heat pipes; a second chamber for accommodating a second heat-transfer working medium is defined jointly by each of the first heat transfer members of the one of the every adjacent two heat pipes and a corresponding one of the second heat transfer members of the every adjacent two heat pipes, and the second chamber and the first chamber are spaced apart; and a heat exchange part including a heat exchanger, wherein the heat exchanger is configured for transferring heat collected by the geothermal energy collecting part.

Additional aspects and advantages of the present disclosure will be provided in part in the following description, in part as will become apparent from the following description, or as will be learned through the practice of the present disclosure.

BRIEF DESCRIPTION OF THE DRAWINGS

The above and/or additional aspects and advantages of the present disclosure will be apparent and readily appreciated from the description of the embodiments with reference to the following accompanying drawings. In the drawings.

DETAILED DESCRIPTION OF THE EMBODIMENTS

Figure 1:
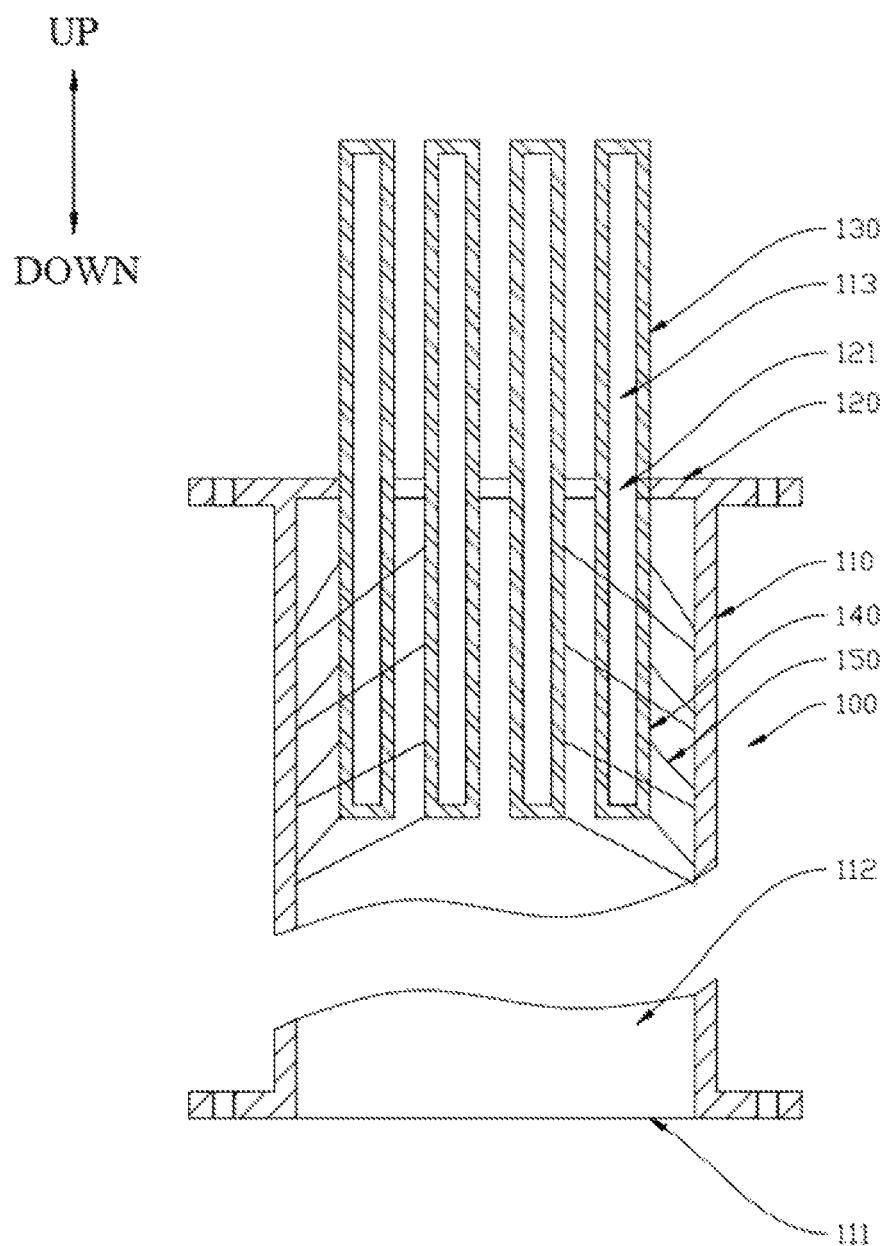
FIG. 1 is a sectional view of a heat pipe in accordance with an embodiment of the present disclosure.

The concept and resulting technical effects of the present disclosure will be clearly and completely described below with reference to the embodiments so as to fully understand the objects, features and effects of the present disclosure. Apparently, the described embodiments are merely a part rather than all of the embodiments of the present disclosure. Based on the embodiments of the present disclosure, all other embodiments obtained by a person of ordinary skill in the art under the premise of without contributing creative efforts shall fall within the scope protected by the present disclosure.

In the description of the embodiments of the present disclosure, if it is referred to orientation description, orientation or positional relationship indicated by "upper", "lower" and the like is based on the orientation or positional relationship shown in the drawings only for convenience of describing the present invention and simplifying the description rather than indicating or implying that the device or element referred to must have a particular orientation, be constructed and operate in a particular orientation, and thus are not to be construed as limiting the present disclosure.

In the description of the embodiments of the present disclosure, if a certain feature is referred to as being "arranged", "fixed", "connected", or "installed" on an other feature, it may be directly arranged, fixed, or connected to the other feature, or may be indirectly arranged, fixed, or connected, or installed on the other feature. In the description of embodiments of the present disclosure, where "multiple" is referred to, it means two or more. "First" and "second", if referred to, should be construed as being used to distinguish technical features rather than indicating or implying relative importance or implying a number of the indicated technical features or implying a sequential relationship of the indicated technical features.

In related technologies, the heat pipes are connected to each other by sealing plugs, heat in the lower-stage heat pipe needs to be transferred to the upper-stage heat pipe via the sealing plug. The larger the heat resistance of the sealing plug, the smaller the heat exchange area which leads to great loss of the heat in the transfer process. When the length of the heat pipe unit is longer (generally, the length of the heat pipe unit may be several kilometers when the geothermal resources are located at a deep position of the earth's crust), the problem of heat transfer failure is prone to occurring.

Based on this, a heat pipe is provided by the present disclosure. By providing first heat transfer members and second heat transfer members on the heat pipe, interstage heat pipes can be formed when the heat pipes are connected in series. The heat transfer can be performed via the interstage heat pipes instead of the sealing plugs, so that the heat resistance can be effectively reduced, the heat exchange area can be increased, and the heat loss can be reduced.

The heat pipe in accordance with an embodiment of the present disclosure is illustrated below with reference to FIG. 1 to FIG. 5.

Referring to FIG. 1, in some embodiments of the present disclosure, a heat pipe 100 includes a first pipe body 110, a sealing member 120, first heat transfer members 130, and second heat transfer members 140. One end of the first pipe body 110 has an opening 111, the other end of the first pipe body 110 is sealed by the sealing member 120, and the first pipe body 110 has a first chamber 112 for accommodating a heat transfer working medium. The sealing member 120 is provided with channels 121 to achieve the communication between the internal and the external of the first pipe body 110. Each first heat transfer member 130 and a corresponding second heat transfer member 140 are both connected to the sealing member 120 and are respectively located at two opposite sides of the sealing member 120. Each of the first heat transfer member 130 and the second heat transfer member 140 has a cavity. The cavities of the first heat transfer member and the second heat transfer member communicate with each other via the channel 121 of the sealing member 120, so that the first heat transfer member 130 and the second heat transfer member 140 can jointly define a second chamber 113 for accommodating the heat-transfer working medium, and the second chamber 113 and the first chamber 112 are spaced apart.

Specifically, the first pipe body 110 of the embodiment is a cylindrical pipe and can be made of a heat-conducting material, which includes but is not limited to metallic materials such as copper, aluminum, steel and stainless steel, non-metallic materials such as polylmethyl methacrylate (PMMA), polycarbonate (PC), polyethylene (PE), polyethylene glycol terephthalate (PET) and glass, laminated composites such as an aluminum-plastic film and a composite film of plastic and metal foil, and doped composites such as ceramic-based composites and resin-based composites. Based on an actual use scenario of the heat pipe, the upper end in FIG. 1 is used as the head end of the first pipe body 110, and the lower end is used as the tail end of the first pipe body 110, and a direction from bottom to top is a heat transfer direction. In addition, in two connected heat pipes 100, the heat pipe located relatively above is referred to as an upper-stage heat pipe, and the heat pipe located relatively below is referred to as a lower-stage heat pipe (the meanings of the head end, the tail end, the heat transfer direction, the upper stage and the lower stage described hereinafter are the same as those). One end (e.g., the tail end in FIG. 1) of the first pipe body 110 is formed with the opening 111, and the head end of the first pipe body is sealed by the sealing member 120. As such, referring to FIG. 2, when the two heat pipes 100 are connected in an end-to-end manner, the sealing member 120 of the lower-stage heat pipe 100 can seal the opening 111 of the upper-stage heat pipe 100, so that the first chamber 112 of the upper-stage heat pipe 100 is in a sealed state, thereby facilitating to form a vacuum environment in the first chamber 112 to accelerate phase change of the working medium.

It can be understood that it is also possible that the head end of the first pipe body 110 is formed with the opening 111, and the tail end of the first pipe body is sealed by the sealing member 120.

The sealing member 120 is configured for sealing the end part of the first pipe body 110. In the embodiment, the sealing member 120 is an end plate which is connected to the first pipe body 110 by welding or the like. The sealing member 120 is provided with channels 121 which may be through holes or other structures.

The first heat transfer member 130 and the second heat transfer member 140 may both be cylindrical pipe bodies and are respectively located at two opposite sides of the sealing member 120. By taking FIG. 1 as an example, when the sealing member 120 is located at the head end of the first pipe body 110, the first heat transfer member 130 is located at the upper side of the sealing member 120, i.e., the first heat transfer member 130 extends to the outside of the first pipe body 110. The second heat transfer member 140 is located at the lower side of the sealing member 120, i.e., the second heat transfer member is located in the first pipe body 110.

Figure 2:
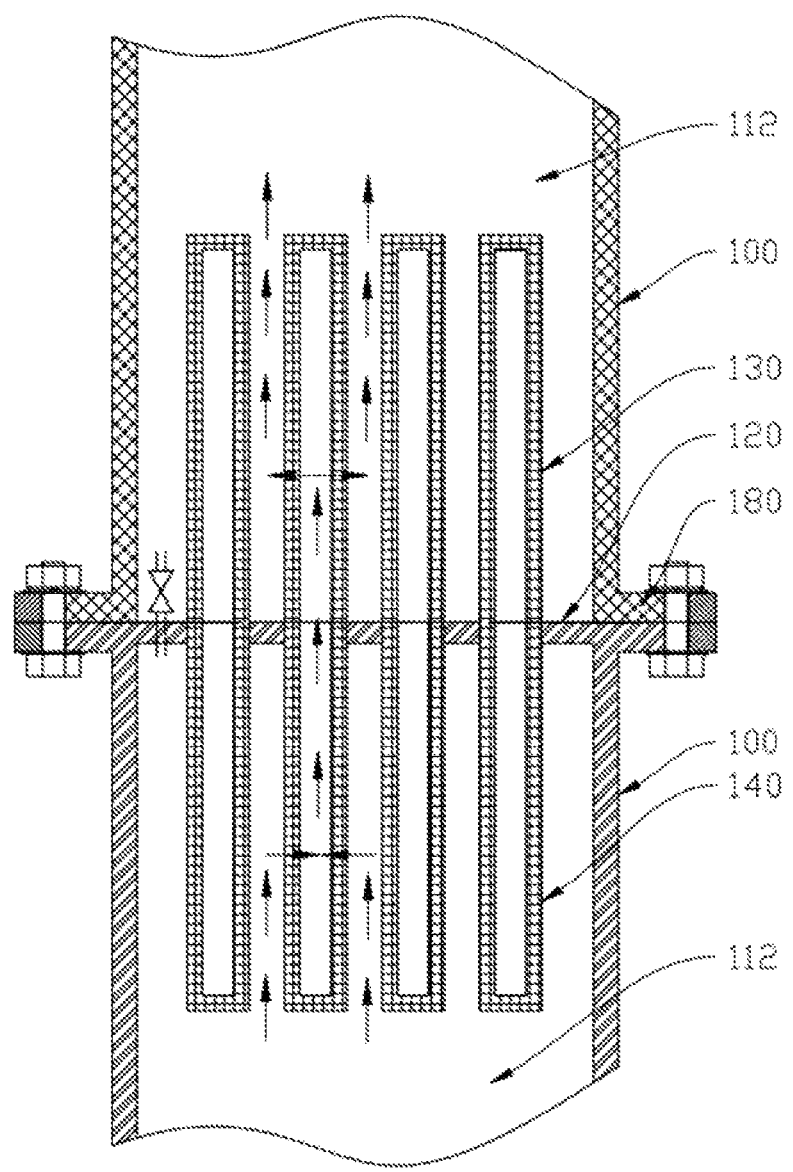
FIG. 2 is a sectional view of a heat pipe unit formed by the heat pipes in FIG. 1.

Referring to FIG. 2, an arrow in the figure denotes a heat transfer direction. When the two heat pipes 100 are connected in an end-to-end manner, the first heat transfer members 130 of the lower-stage heat pipe are located at the first chamber 112 of the upper-stage heat pipe 100. After the lower-stage heat pipe 100 collects geothermal energy or receives the heat from a further lower-stage heat pipe, the working medium in each first chamber 112 of the lower-stage heat pipe 100 is heated to evaporate and form steam, and the steam rises to the head end of the lower-stage heat pipe 100 to exchange heat with the second heat transfer members 140. Then, the heat is transferred to the working medium in each second chamber 113 from the steam, such that the working medium in each second chamber 113 is heated to evaporate, and the steam in the second chambers 113 rises to the first heat transfer members 130 to exchange heat again. The heat is transferred to the working medium in the first chamber 112 of the upper-stage heat pipe 100 from the steam in the second chambers 113, the working medium in the first chamber 112 of the upper-stage heat pipe 100 is heated to evaporate, and the heat is transferred to a further upper-stage heat pipe 100 according to above processes. On the other hand, the steam in the first chamber 112 of the lower-stage heat pipe 100 undergoes condensation after heat transfer and then flows back to the bottom of the lower-stage heat pipe 100. And the steam in the second chambers 113 undergoes condensation after heat transfer and then flows back to the bottom of the second heat transfer members 140, thus achieving circular transfer.

In the embodiment, the first heat transfer member 130 and the second heat transfer member 140 can each be made of a heat-conducting material, e.g., the same material as the first pipe body 110.

In the embodiment, the working medium includes but is not limited to deionized water, acetone, methanol, heptane, ethanol, methanol, ammonia, carbon dioxide, and the like. Different working media and different liquid filling ratios can be used in the heat pipes 100 at different positions. The liquid filling ratio can be set according to actual design requirements, such as 5% to 50%.

In the embodiment, the heat pipe 100 is provided with the first heat transfer members 130 and the second heat transfer members 140. In a heat pipe unit formed by connecting the multiple heat pipes 100, the heat transfer can be performed between the adjacent heat pipes via interstage heat pipes formed by the first heat transfer members 130 and the second heat transfer members 140. The interstage heat pipes have a low heat resistance, and is enabled to extend into the first chamber 112 to be fully in contact with the steam, thereby facilitating to improve the heat exchange efficiency.

Referring to FIG. 1, in some specific embodiments of the present disclosure, in a heat transfer direction, the head end of the first pipe body 110 is sealed by the sealing member 120, the first heat transfer members 130 are located at the upper side of the sealing member 120 (i.e., the first heat transfer members 130 are located outside of the first pipe body 110), and the second heat transfer members 140 are located at the lower side of the sealing member 120 (i.e., the second heat transfer members are located inside of the first pipe body 110). The first heat transfer members 130, the second heat transfer members 140 and the sealing member 120 may be connected into a whole, such that each first heat transfer member 130 and a corresponding second heat transfer member 140 form an integral interstage heat pipe to guarantee the sealing property of the second chamber 113.

In some specific embodiments of the present disclosure, the heat pipe further includes flow guiding members 150. One end of the flow guiding member 150 is connected to the second heat transfer member 140, and the other end of the flow guiding member extends downwards and is connected to an inner wall of the first pipe body 110. After the steam in the first chamber 112 of the lower-stage heat pipe 100 is subjected to heat exchange, condensation of the steam may occur on the surface of the second heat transfer member 140, and the condensed working medium in the first chamber 112 can be guided to the inner wall of the first pipe body 110 via the flow guiding members 150 and then flows back, thus preventing the working medium from directly falling from the second heat transfer member 140, which causes the resistance to the rise of the steam to be increased.

The flow guiding member 150 may be of a rod-shaped structure. A liquid-stage working medium is adhered to the surface of the flow guiding member 150 and flows downwards under the action of gravity. The flow guiding member 150 may also include a confluence disc and a flow guiding pipe which are not shown. The confluence disc is arranged along a circumferential direction of the second heat transfer member 140 (may cover only a part of the circumference, e.g., ¼ of the circumference, of the second heat transfer member 140 to avoid obstruction to the rise of the steam) and extends out substantially along a radial direction of the second heat transfer member 140. The confluence disc may be recessed downwards to form a chamber for accumulating the liquid-state working medium. One end of the flow guiding pipe communicates with the chamber of the confluence disc, and the other end of the flow guiding pipe extends to the inner wall of the first pipe body 110. Therefore, the liquid-state working medium can be collected in the confluence disc firstly and then is guided to the inner wall of the first pipe body 110 via the flow guiding pipe. It can be understood that the flow guiding member 150 is not limited to above structures, and it may use any structure capable of guiding the liquid-state working medium on the second heat transfer member 140 downwards to the pipe wall.

It can be understood that the second heat transfer member 140 may be provided with multiple flow guiding members 150 arranged along the heat transfer direction, or may be provided with multiple flow guiding members 150 along the circumferential direction, thus further preventing the liquid-state working medium from directly falling.

Figure 3:
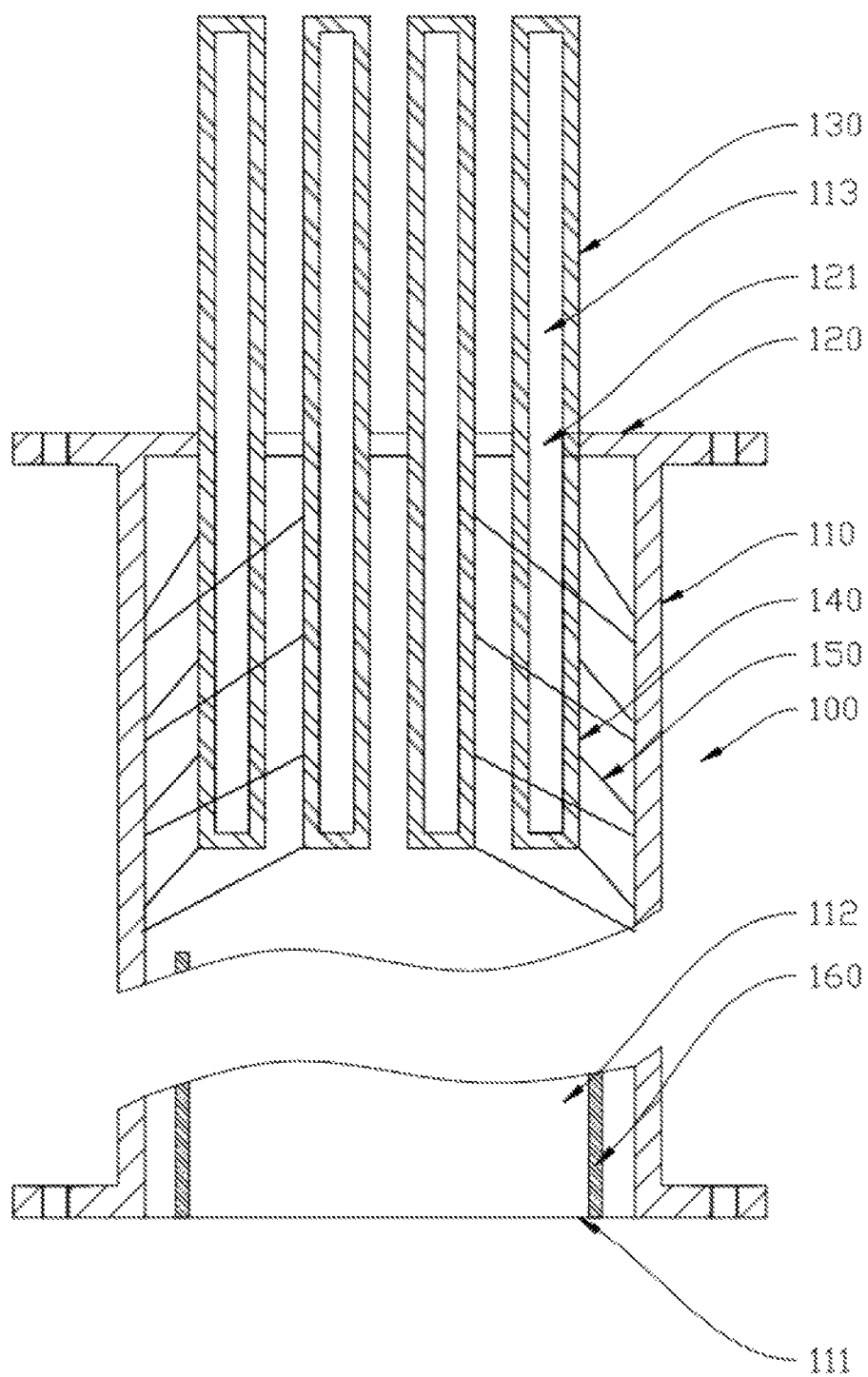
FIG. 3 is another sectional view of a heat pipe in accordance with an embodiment of the present disclosure.

Referring to FIG. 3, in some specific embodiments of the present disclosure, the heat pipe 100 further includes a second pipe body 160. The second pipe body 160 is located at the inner side of the first pipe body 110, and a gap is formed between the second pipe body 160 and the first pipe body 110.

In the embodiment, the second pipe body 160 may be a cylindrical pipe and is coaxial with the first pipe body 110. An outer diameter of the second pipe body 160 is less than an inner diameter of the first pipe body 110. When the second pipe body 160 is installed in the first pipe body 110, a gap can be formed between the second pipe body 160 and the first pipe body 110. Therefore, the second pipe body 160 can divide the first chamber 112 into a steam channel and a liquid channel. The hot steam can rise through the steam channel in the middle, the liquid-state working medium can flow in the liquid channel between the second pipe body 160 and the first pipe body 110, thus preventing the reflow of the liquid-state working medium from affecting the rise of the steam.

Figure 4:
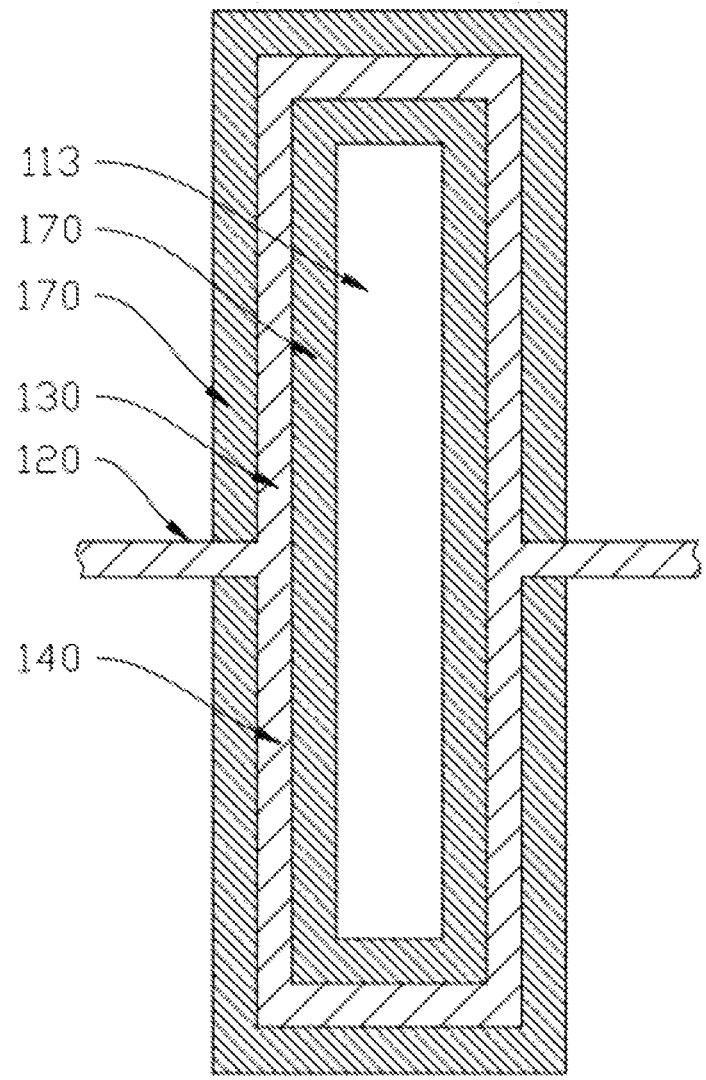
FIG. 4 is another sectional view of an interstage heat pipe with wicks in accordance with an embodiment of the present disclosure.

Referring to FIG. 4, in some specific embodiments of the present disclosure, the surfaces of the first heat transfer member 130 and the second heat transfer member 140 each are provided with wicks 170. In general, the thickness of the wick 170 is 0.01 to 0.25 times of the pipe diameter. Specifically, the inner and outer surfaces of the first heat transfer member 130 and the inner and outer surfaces of the second heat transfer member 140 each are provided with wicks 170, the wicks 170 can guide the liquid-state working medium to flow as well as increase the heat exchange area to increase the heat exchange efficiency. The wick 170 may be a laminated structure attached to the surface of the heat transfer member, such as foam metal, a wire mesh, and sintered powder; or may be a trench structure directly formed on the surface of the heat transfer member. A cross-sectional shape of the trench may be arc-shaped, triangular, rectangular, trapezoidal, or the like. It can be appreciated that the wick 170 may also be a combination of the trench structure and the laminated structure.

In some specific embodiments of the present disclosure, when the heat pipe 100 is used for collecting geothermal energy, the surfaces of the first pipe body 110 is provided with the wicks 170, thus increasing the collecting capacity of the heat pipe 100.

Referring to FIG. 1, in some specific embodiments of the present disclosure, the two heat pipes 100 may be connected by fasteners such as bolts. Specifically, each of the head end and the tail end of the heat pipe 100 is provided with a flange 180 with through hole therein. When the butt joint of the two heat pipes 100 is completed, the fixation between the heat pipes 100 can be achieved by connecting the flanges 180 via the bolts. It can be understood that the sealing member, such as a sealing ring, may also be arranged between the flanges 180 to achieve the sealing of the first chamber 112.

Figure 5:
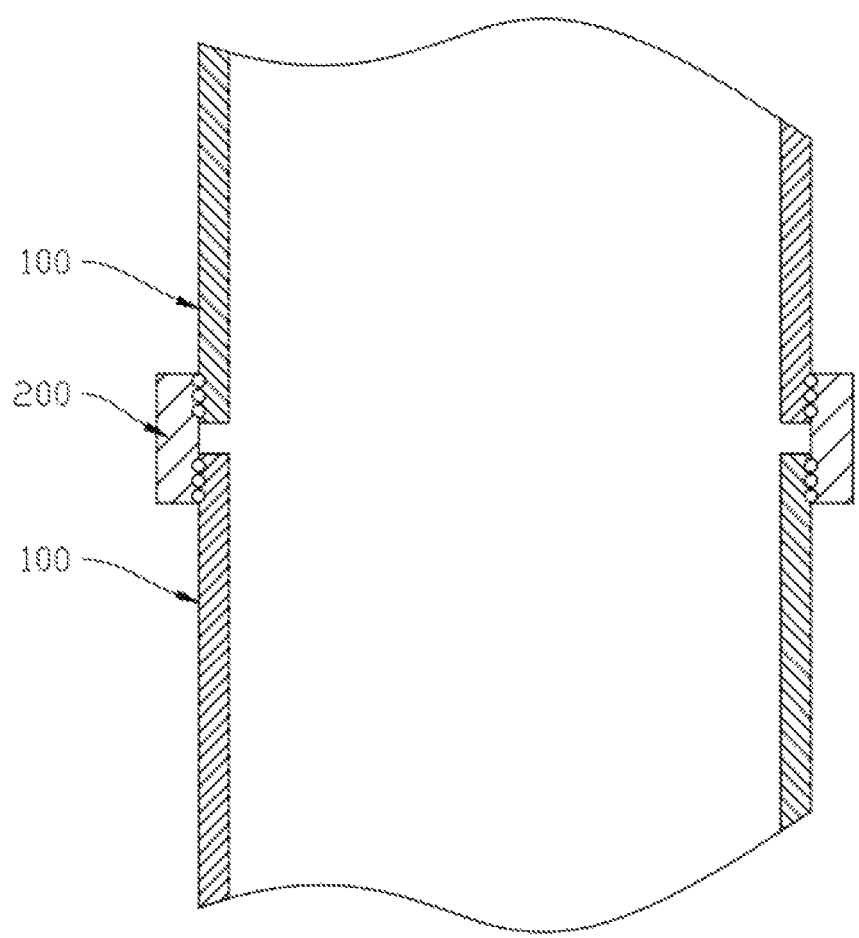
FIG. 5 is a sectional view of a connection of two first pipe bodies in accordance with an embodiment of the present disclosure.

Referring to FIG. 5, for ease of understanding, only the first pipe body 110 of the heat pipe 100 is illustrated. In some specific embodiments of the present disclosure, the two heat pipes 100 may be connected by a connecting sleeve 200. Specifically, each of the head end and the tail end of the heat pipe 100 is provided with an external thread, and an inner wall of the connecting sleeve 200 is provided with an internal thread. The fixation can be achieved by respectively screwing the ends of the every adjacent two heat pipes 100 into the connecting sleeve 200. It can be understood that the fixation between the connecting sleeve 200 and the heat pipe 100 can be achieved directly by welding.

In some specific embodiments of the present disclosure, the first pipe body 110 is provided with a vacuumizing hole and a liquid injection hole. The vacuumizing hole is configured for being connected to vacuumizing equipment so as to form a vacuum environment inside the first pipe body 110. And the liquid injection hole is configured for being connected to liquid injection equipment so as to inject the working medium into the first chamber 112.

Referring to FIG. 1, in some specific embodiments of the present disclosure, a single heat pipe 100 includes multiple interstage heat pipes which are arranged in parallel and along an axial direction of the first pipe body 110. It can be understood that the multiple interstage heat pipes may also be replaced with a single interstage heat pipe having a large pipe diameter.

Figure 6:
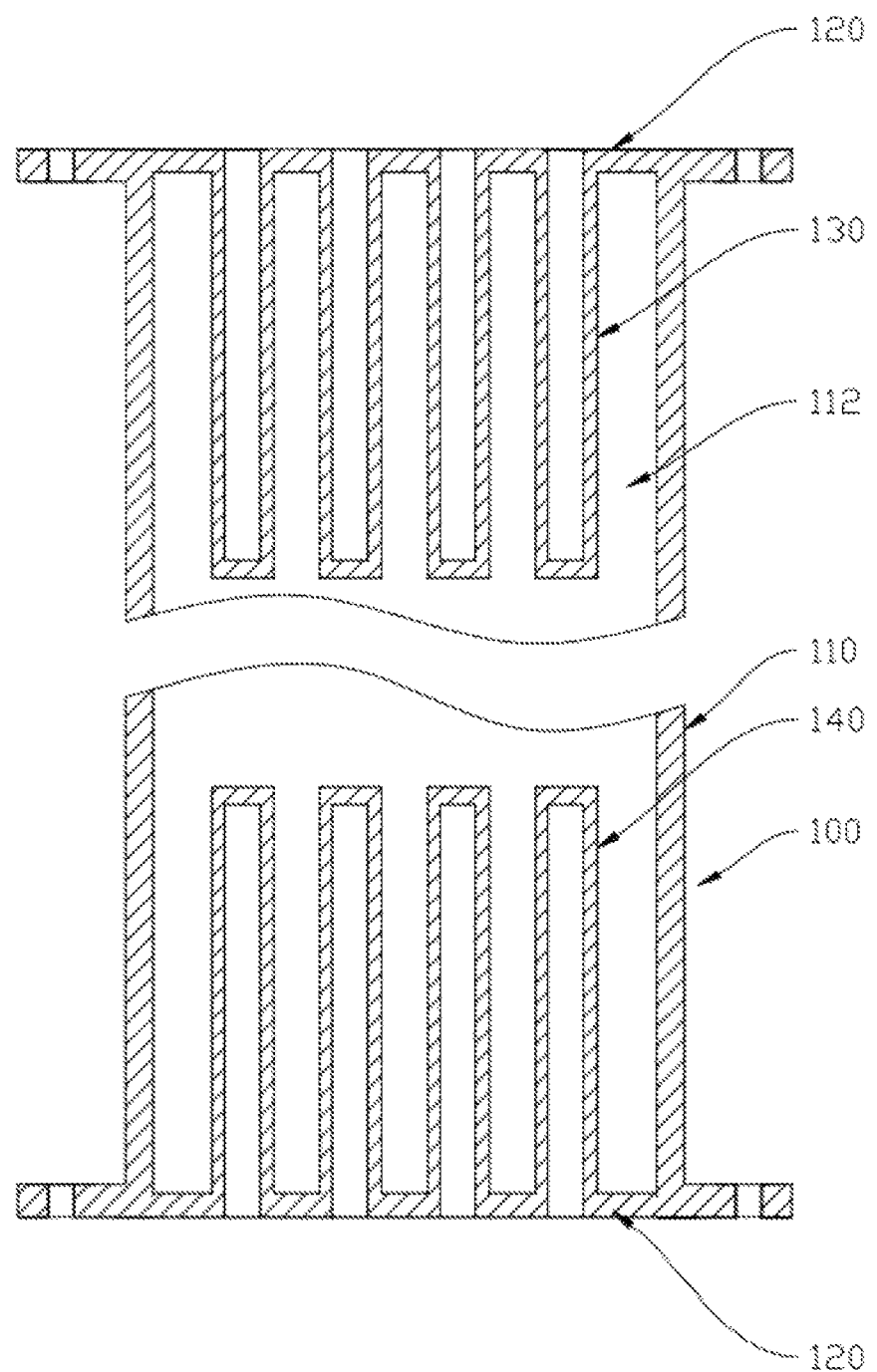
FIG. 6 is yet another sectional view of a heat pipe in accordance with an embodiment of the present disclosure.

Referring to FIG. 6, in some other embodiments of the present disclosure, the heat pipe 100 includes a first pipe body 110, sealing members 120, a first heat transfer member 130, and a second heat transfer member 140. Each of the two ends of the first pipe body 110 is sealed by the sealing member 120, and the first pipe body 110 has a first chamber 112 for accommodating a heat transfer working medium. The first heat transfer members 130 are connected to one of the sealing members 120 and are located in the first chamber 112, and the first heat transfer member 130 has a cavity. The second heat transfer members 140 are connected to an other sealing member 120 and are located in the first chamber 112. And, the second heat transfer member 140 has a cavity.

Figure 7:
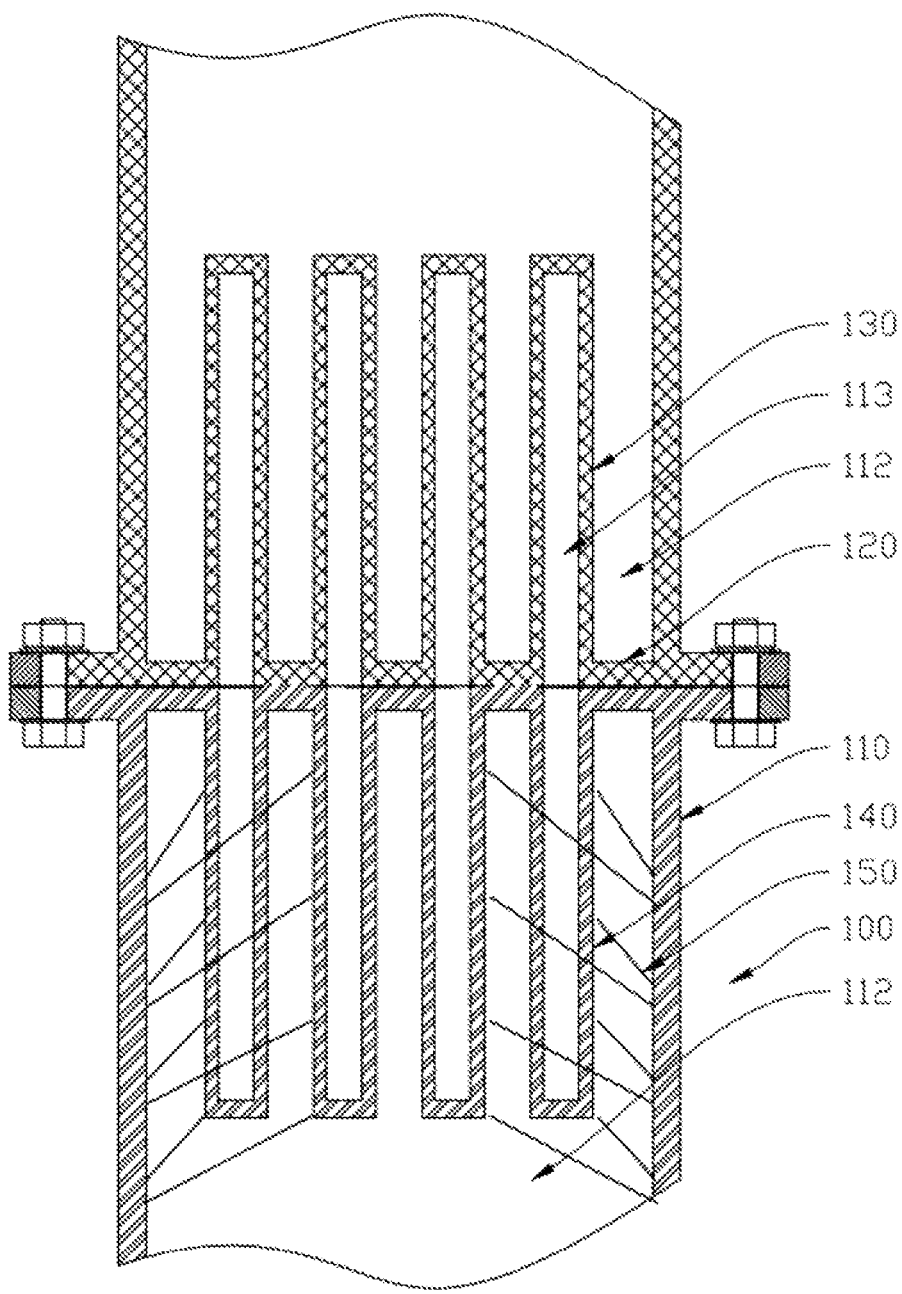
FIG. 7 is a sectional view of a heat pipe unit formed by the heat pipes in FIG. 6.

In the embodiment, the first heat transfer member 130 is connected to the sealing member 120 at the head end of the first pipe body 110 which is provided with a channel communicating with the cavity in the first heat transfer member 130. Correspondingly, the second heat transfer member 140 is connected to the sealing member 120 at the tail end of the first pipe body 110 which is provided with a channel communicating with the cavity in the second heat transfer member 140. And, the channels of the sealing members 120 at the head and tail ends are arranged in one-to-one correspondence. Referring to FIG. 7, when the two heat pipes 100 are connected in an end-to-end manner, the sealing member 120 at the tail end of the upper-stage heat pipe 100 is attached to the sealing member 120 at the head end of the lower-stage heat pipe 100, and the sealing members are fixed via the threaded fasteners and the flanges. The second heat transfer member 140 of the upper-stage heat pipe 100 is in butt joint with the first heat transfer member 130 of the lower-stage heat pipe 100, and the cavities of each first heat transfer member and a corresponding second heat transfer member communicate with each other via the channel of the sealing member 120, such that the second heat transfer members 140 of the upper-stage heat pipe 100 and the first heat transfer members 130 of the lower-stage heat pipe 100 jointly form interstage heat pipes to define a second chamber 113. Therefore, the purpose of respectively connecting the upper-stage heat pipe 100 and the lower-stage heat pipe 100 via the interstage heat pipes may also be achieved.

Figure 8:
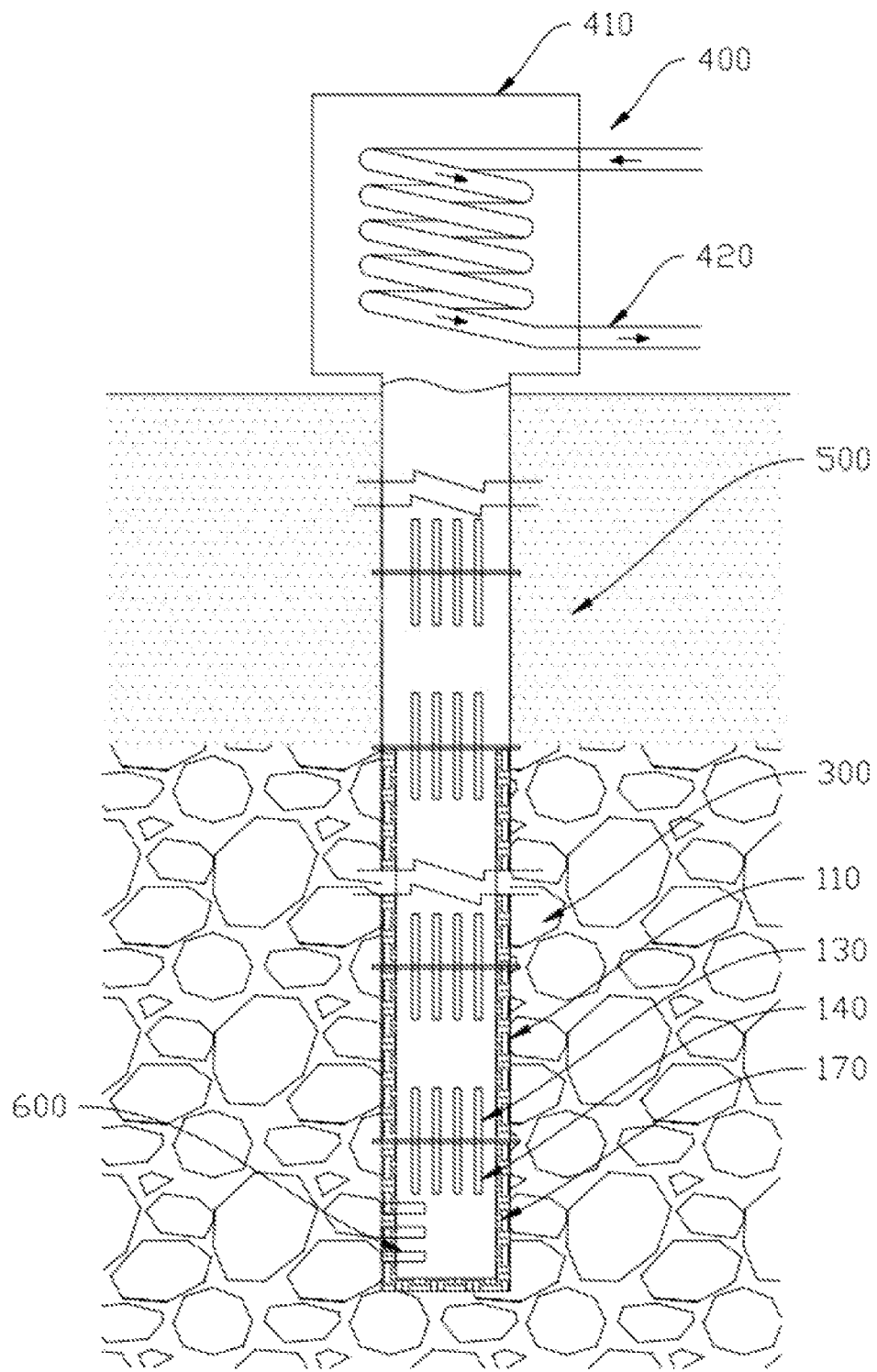
FIG. 8 is a sectional view of a geothermal energy collecting device in an operating state in accordance with an embodiment of the present disclosure.

Referring to FIG. 8, an arrow in a heat exchange part 400 denotes a flow direction of a heat transfer medium. In some other embodiments of the present disclosure, a geothermal energy collecting device is further disclosed. The geothermal energy collecting device includes a geothermal energy collecting part 300 and a heat exchange part 400. The geothermal energy collecting part 300 includes multiple heat pipes 100. The heat pipes 100 may use the heat pipes of the embodiments shown in FIGS. 1 to 5, and the heat pipes 100 are connected in a manner shown in FIG. 2, i.e., one end of the upper-stage heat pipe 100 having the opening 111 is connected to one end of the lower-stage heat pipe 100 having the sealing member 120, thus transferring the heat from bottom to top. The heat exchange part 400 is configured for transferring the heat collected by the geothermal energy collecting part 300 to other equipment via the heat transfer medium.

In the embodiment, the surfaces of the heat pipes 100 constituting the geothermal energy collecting part 300 are provided with wicks 170 to enhance heat exchange capacity.

In the embodiment, the heat exchange part 400 is located on the ground and includes a shell 410 and a heat exchange pipeline 420. The shell 410 communicates with the first chamber 112 of the uppermost-stage heat pipe 100, the heat exchange pipeline 420 is located in the shell 410 and is enabled to be in direct contact with the steam in the first chamber 112, thus transferring the heat to the heat transfer medium of the heat exchange pipeline 420 from the steam.

Figure 9:
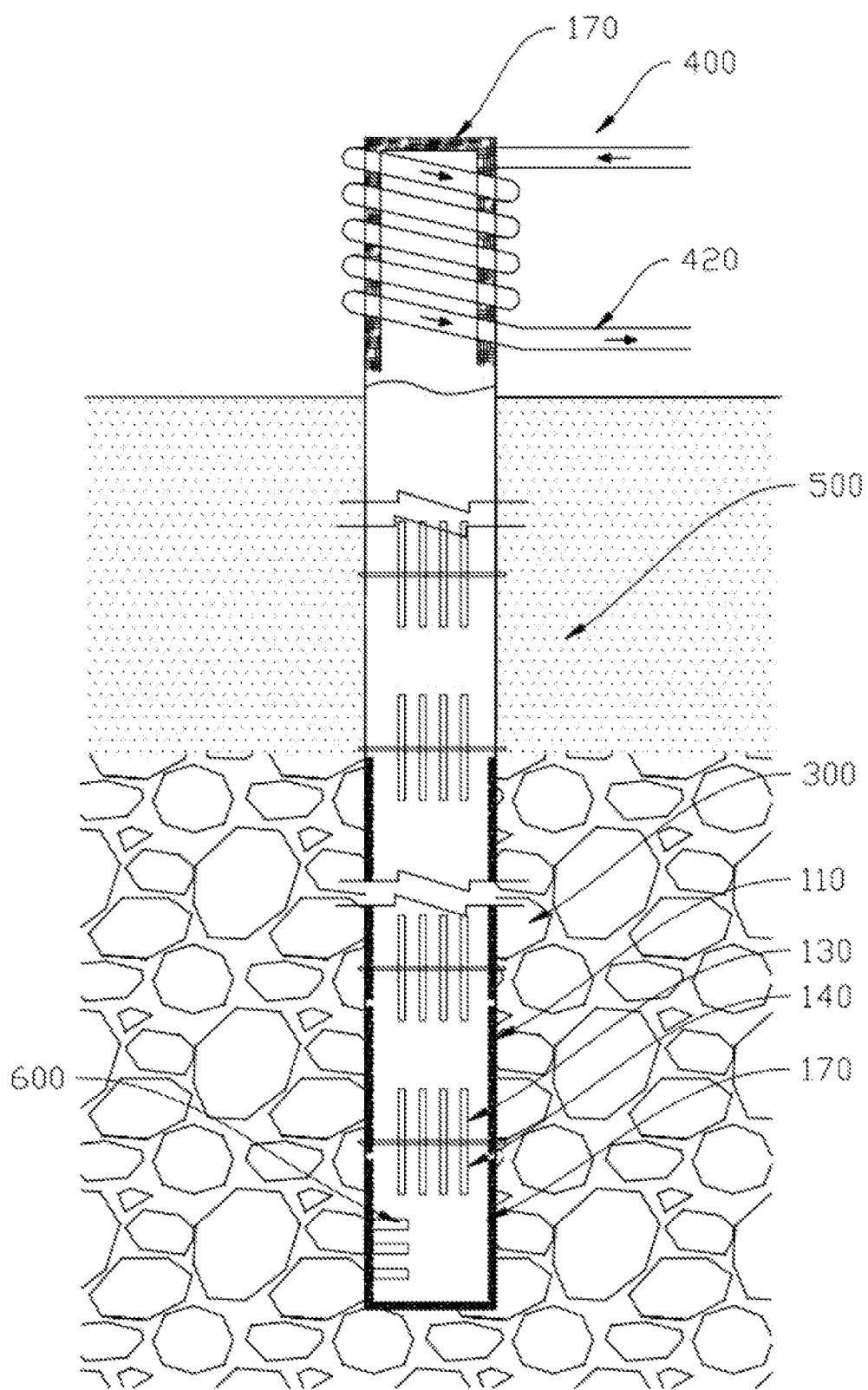
FIG. 9 is another sectional view of a geothermal energy collecting device in an operating state in accordance with an embodiment of the present disclosure.

Referring to FIG. 9, in some specific embodiments of the present disclosure, the heat exchange pipeline 420 is wound outside of the shell 410, the heat of the steam is firstly transferred to the shell and then is transferred to the heat exchange pipeline 420 via the shell 410. In order to increase the heat exchange area, the surfaces of the shell 410 is provided with wicks 170.

It can be understood that the heat exchange part 400 may also use other well-known heat exchange structures, such as a shell-and-tube exchanger or a plate type heat exchanger.

Referring to FIG. 8 and FIG. 9, in some specific embodiments of the present disclosure, the geothermal energy collecting device further includes a heat transfer part 500. Along the heat transfer direction, the tail end of the heat transfer part 500 is connected to the head end of the geothermal energy collecting part 300, and the head end of the heat transfer part 500 is connected to the heat exchange part 400 to transfer the heat in a non-heat-source region.

In some specific embodiments of the present disclosure, the heat transfer part 500 includes multiple heat pipes 100, the multiple heat pipes 100 may use the heat pipes of the embodiments shown in FIGS. 1 to 5, the heat pipes 100 are connected in a manner shown in FIG. 2, i.e., one end of the upper-stage heat pipe 100 having the opening 111 is connected to one end of the lower-stage heat pipe 100 having the sealing member 120, thus transferring the heat from bottom to top. The surfaces of the heat pipes 100 constituting the geothermal energy collecting part 300 may each be provided with wicks 170, or may each be a smooth surface.

Referring to FIG. 8, in some specific embodiments of the present disclosure, in the multiple heat pipes 100 constituting the geothermal energy collecting part 300, the heat pipe 100 at the bottommost is provided with a starting device 600. Multiple temperature and multiple pressure sensors are arranged on a pipe wall of the heat pipe 100, the temperature and pressure sensors are configured for detecting the temperature and air pressure in the heat pipe. When a state that the working medium is too cold to boil occurs, the working medium can be heated by the starting device 600. In the embodiment, the starting device 600 may be a heating device such as an electric heating rod.

In some other embodiments of the present disclosure, the geothermal energy collecting device includes a geothermal energy collecting part 300 and a heat exchange part 400; the geothermal energy collecting part 300 includes multiple heat pipes 100, the multiple heat pipes 100 may use the heat pipes of the embodiment shown in FIG. 6, and the heat pipes 100 are connected in a manner shown in FIG. 7, i.e., the tail end of the upper-stage heat pipe 100 having the second heat transfer member 140 is connected to the head end of the lower-stage heat pipe 100 having the first heat transfer member 130, thus transferring the heat from bottom to top. The heat exchange part 400 is configured for transferring the heat collected by the geothermal energy collecting part to other equipment via the heat transfer medium.

Although the embodiments of the present disclosure are described in detail above with reference to the accompanying drawings, the present disclosure is not limited to the embodiments described above, and various modifications may be made without departing from the spirit of the present disclosure within the knowledge of those skilled in the art. Furthermore, the embodiments of the present disclosure and features in embodiments may be combined with each other without conflict.

What is claimed is:

1. A geothermal energy collecting device, comprising:
   a geothermal energy collecting part comprising ones of a plurality of heat pipes, wherein each of the plurality of the heat pipes comprises:
   a sealing member provided with channels;

a first pipe body, wherein one end of the first pipe body has an opening and an other end of the first pipe body is sealed by the sealing member, the first pipe body has a first chamber for accommodating a heat transfer working medium;

first heat transfer members which are connected to the sealing member and located at one side of the sealing member, wherein each of the first heat transfer members has a first cavity; and second heat transfer members which are connected to the sealing member and located at an other side of the sealing member, wherein each of the second heat transfer members has a second cavity configured to communicate with the first cavity of a corresponding one of the first heat transfer members via a respective one of the channels, such that a second chamber for accommodating a second heat-transfer working medium is defined jointly by the second heat transfer member and the corresponding one of the first heat transfer members, and the second chamber and the first chamber are spaced apart, wherein one end of one of every adjacent two of the ones of the plurality of heat pipes which has the opening is connected to one end, which has the sealing member, of an other one of the every adjacent two of the ones of the plurality of heat pipes;

a heat exchange part comprising a heat exchanger, wherein the heat exchanger is configured for transferring heat collected by the geothermal energy collecting part;

wherein a head end of the first pipe body is sealed by the sealing member, the first heat transfer members are located at an upper side of the sealing member, and the second heat transfer members are located at a lower side of the sealing member along a heat transfer direction;

the heat pipe further comprises flow guiding members, each of the second heat transfer members is connected with ones of the flow guiding members, one end of each of the ones of the flow guiding members is connected to the second heat transfer member, and an other end of the flow guiding member extends downwards and is connected to an inner wall of the first pipe body.

2. The geothermal energy collecting device according to claim 1, further comprising a heat transfer part, wherein a tail end of the heat transfer part is connected to a head end of the geothermal energy collecting part, and a head end of the heat transfer part is connected to the heat exchange part along a heat transfer direction.

3. The geothermal energy collecting device according to claim 2, wherein the heat transfer part comprises other ones of the plurality of heat pipes, one end, which has the opening, of one of every adjacent two of the other ones of the plurality of heat pipes is connected to one end, which has the sealing member, of an other one of the every adjacent two of the other ones of the plurality of heat pipe.

4. The geothermal energy collecting device according to claim 1, wherein two ends of each of the heat pipes are provided with respective flanges, and every adjacent two of the heat pipes are attached via adjacent two of the respective flanges and are connected by threaded fasteners; or the device further comprises connecting sleeves, and adjacent ends of the every adjacent two of the heat pipes are inserted into a corresponding one of the connecting sleeves.

5. The geothermal energy collecting device according to claim 1, further comprising a second pipe body, wherein the second pipe body is located at an inner side of the first pipe body, and a gap is formed between the second pipe body and the first pipe body.

6. The geothermal energy collecting device according to claim 1, wherein a surface of each of the first heat transfer members and a surface of a corresponding one of the second heat transfer members are provided with wicks.

7. The geothermal energy collecting device according to claim 1, wherein an inner surface of the first pipe body is provided with wicks.

8. The geothermal energy collecting device according to claim 1, further comprising a heat transfer part, wherein a tail end of the heat transfer part is connected to a head end of the geothermal energy collecting part, and a head end of the heat transfer part is connected to the heat exchange part along the heat transfer direction.

9. The geothermal energy collecting device according to claim 5, further comprising a heat transfer part, wherein a tail end of the heat transfer part is connected to a head end of the geothermal energy collecting part, and a head end of the heat transfer part is connected to the heat exchange part along the heat a heat transfer direction.

10. The geothermal energy collecting device according to claim 6, further comprising a heat transfer part, wherein a tail end of the heat transfer part is connected to a head end of the geothermal energy collecting part, and a head end of the heat transfer part is connected to the heat exchange part along the heat transfer direction.

11. The geothermal energy collecting device according to claim 7, further comprising a heat transfer part, wherein a tail end of the heat transfer part is connected to a head end of the geothermal energy collecting part, and a head end of the heat transfer part is connected to the heat exchange part along a heat transfer direction.

12. The geothermal energy collecting device according to claim 8, wherein the heat transfer part comprises other ones of the plurality of heat pipes, one end, which has the opening, of one of every adjacent two of the other ones of the plurality of heat pipes is connected to one end, which has the sealing member, of an other one of the every adjacent two of the other ones of the plurality of heat pipe.

* * * * *